United States Patent

Rezek et al.

[15] 3,644,757

[45] Feb. 22, 1972

[54] VOLTAGE AND TEMPERATURE STABILIZED MULTIVIBRATOR CIRCUIT

[72] Inventors: John R. Rezek, Addison, Ill.; Thomas M. Yackish, Hammond, Ind.

[73] Assignee: Motorola, Inc., Franklin Park, Ill.

[22] Filed: Sept. 17, 1969

[21] Appl. No.: 858,830

[52] U.S. Cl. ..............................307/273, 307/293, 331/113, 331/176

[51] Int. Cl. ..............................H03k 3/284

[58] Field of Search ..............................307/273, 293; 331/113, 176

[56] References Cited

UNITED STATES PATENTS

| | | | |
|---|---|---|---|
| 2,933,625 | 4/1960 | Townsend et al. | 307/293 |
| 3,125,691 | 3/1964 | Astheimer | 307/267 X |
| 3,213,297 | 10/1965 | Greene | 307/273 X |
| 3,239,778 | 3/1966 | Rywak | 331/176 X |
| 3,264,528 | 8/1966 | Leifer | 307/293 X |
| 3,304,443 | 2/1967 | Sheahan et al | 307/273 |
| 3,196,201 | 7/1965 | McDonald | 84/1.26 |

*Primary Examiner*—Stanley D. Miller, Jr.
*Assistant Examiner*—R. C. Woodbridge
*Attorney*—Mueller & Aichele

[57] ABSTRACT

An integrated circuit monostable multivibrator is provided with an extremely stable time constant at nominal supply voltages of 1.2 volts by commutating the timing capacitor of the multivibrator between boundary conditions which vary together to compensate for variations in supply voltage and temperature.

16 Claims, 3 Drawing Figures

INVENTORS
JOHN R. REZEK
THOMAS M. YACKISH
BY
Mueller, Aichele & Rauner
ATTYS.

VOLTAGE AND TEMPERATURE STABILIZED MULTIVIBRATOR CIRCUIT

BACKGROUND OF THE INVENTION

In the provision of timing circuits for use in conjunction with other electronic circuits of various types, it is desirable that the timing period of the timing circuit be independent of voltage and temperature variations in order to provide stability of operation of the circuit with which the timing circuit is to be used. Temperature compensated multivibrator circuits exhibiting a high degree of stability have been manufactured by integrated circuit techniques which permit matching of the components for temperature compensation. In order to provide stabilized operation irrespective of voltage variations of the supply voltage, it generally has been the practice to use a forward biased string of series connected diodes or Zener diodes. The disadvantage of the use of such diode circuits, however, is that the inherent voltage drop across each diode junction (on the order of 0.6 volts) precludes the use of this type of voltage compensation for a circuit where extremely low supply voltages are to be used.

SUMMARY OF THE INVENTION

Accordingly it is an object of this invention to provide a new and improved voltage and temperature compensated multivibrator circuit.

It is another object of this invention to commutate the timing capacitor of a multivibrator circuit between boundary conditions so as to compensate for variations in supply voltage and temperature and to make the operation of the multivibrator independent of such variations.

It is an additional object of this invention to provide a voltage and temperature stabilized monostable multivibrator circuit capable of operation at low supply voltage levels.

In accordance with a preferred embodiment of this invention, a stable monostable multivibrator circuit includes a first transistor having base, collector, and emitter electrodes with the emitter electrode coupled in a circuit to a point of reference potential. The timing capacitor for the circuit is connected in series with a resistor to the source of operating potential for the circuit, with the junction between the timing capacitor and the resistor being coupled to the base of the first transistor. A further impedance is coupled to the other terminal of the capacitor with the junction between the capacitor and this further impedance also is connected through a normally open switch to the point of reference potential.

When the switch is open, the capacitor is charged through the further impedance and the emitter base path of the first transistor to present a potential on the base of the first transistor which is substantially equal to the potential necessary to maintain the transistor forward biased. When the switch is closed, the transistor is rendered nonconductive; and the capacitor commences charging through the first resistor and the now closed switch toward the forward biasing potential of the first transistor.

In order to cause the time required for this charge to equal the forward bias point of the first transistor to be independent of the voltage variations of the supply voltage, the voltage drop between the junction of the capacitor and the point of reference potential across the closed switch is chosen to be the same as the voltage drop between the base of the first transistor and the point of reference potential when the first transistor is rendered conductive. By fabricating all of the components on a single integrated circuit chip and causing the switch to be a further transistor, it is possible to provide for both temperature compensation and voltage compensation.

In another embodiment of the invention, an additional transistor is connected with the emitter collector path thereof in series between the point of reference potential and the emitter of the first transistor. This further transistor is continuously operated in a saturated condition, with the level of saturation being lower for the transient condition when the first transistor is first rendered conductive and being increased when the first transistor is operating in a steady state condition of conduction.

DETAILED DESCRIPTION

Figures 1, 2:
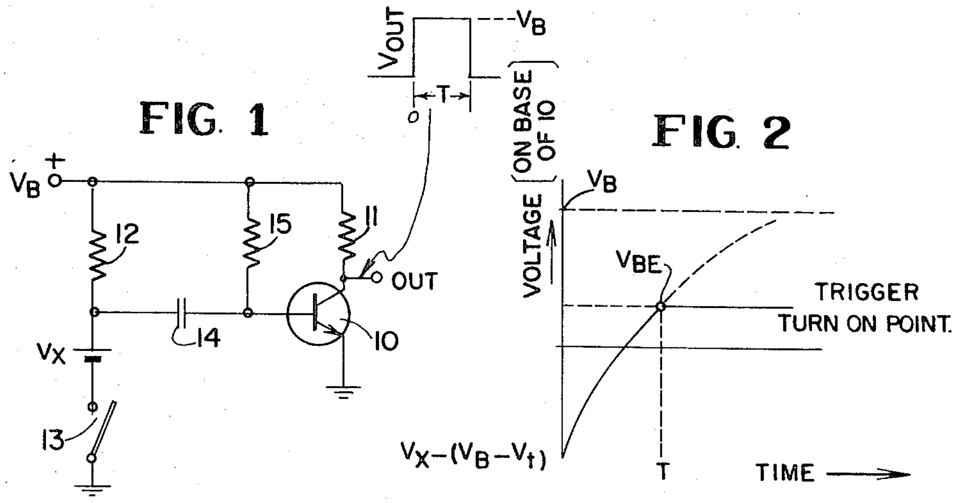
FIG. 1 is a circuit diagram useful in illustrating the principles of the operation of the preferred embodiment of this invention.
FIG. 2 shows a waveform useful in describing the operation of the circuit in FIG. 1.

Referring now to FIG. 1 of the drawing, there is shown a simplified schematic diagram of a monostable multivibrator providing an output pulse for a predetermined length of time after the closure of a switch, irrespective of variations in the voltage of the power supply or variations of the ambient temperature in which the multivibrator circuit is operated. The circuit shown in FIG. 1 ideally should be fabricated on a single integrated circuit chip and includes a transistor 10 as the active or switching amplifier thereof. The collector of the transistor 10 is connected through a conventional collector resistor 11 to a source of positive operating potential (B+), with the emitter of the transistor 10 being connected to ground reference potential.

An additional circuit consisting of an impedance or resistor 12 and a switch 13 also is connected between the source of positive potential and ground, with the junction between the resistor 12 and the switch 13 being connected to one terminal of a timing capacitor 14. The other terminal of the capacitor 14 is connected to the junction of the base of the transistor 10 and a charging resistor 15.

When the switch 13 is opened, the capacitor 14 is charged through a path from the source of B+ extending through the resistor 12, the capacitor 14, and the base emitter path of the transistor 10, forward biasing the transistor 10 into conduction, so that the potential on the collector thereof, forming the output potential for the circuit, is at substantially ground potential. The voltage drop between the base of the transistor 10 and ground in this condition of operation is equal to the voltage $V_{BE}$ which is the voltage drop across the base emitter junction of the transistor 10 and the forward biasing voltage required to drive the transistor 10 into conduction.

At this time, the capacitor 14 is charged to a voltage $V_B - V_{BE}$, where $V_B$ is the voltage of the source of positive potential.

At time $T=O$, the switch 13 may be closed to initiate the operating cycle of the multivibrator. At this time, the voltage $V$ at the base of the transistor 10 instantaneously becomes $V_X-({}_B-V_{BE})$ where $V_X$ is equal to the voltage drop across the switch 13.

With the switch 13 closed, the voltage $V$ on the base of the transistor then changes in accordance with the following:

$$V=V_X-(V_B-V_{BE})+V_B-[V_X-(V_B-V_{BE})](1-e^{-T/RC})$$

At the time the voltage $V$ equals the forward biasing voltage $V_{BE}$ of the transistor 10, the equation becomes:

$$V_{BE}=V_X-(V_B-V_{BE})+V_B-[V_X-(V_B-V_{BE})](1-e^{-T/RC})$$

Solving this equation provides:

$$\frac{V_B-V_{BE}}{2V_B-V_X-V_{BE}}=e^{-T/RC}$$

And solving for time ($T$):

$$T=RC\ln\frac{2V_B-V_X-V_{BE}}{V_B-V_{BE}}$$

From this last equation it is apparent that if the voltage $V_X$, constituting the voltage drop across the switch 13, is made equal to the voltage $V_{BE}$, which is the forward biasing voltage of the transistor 10 between the base of the transistor and ground, it is possible to cause the elimination of all voltage terms from the equation, with the time constant of the circuit becoming:

$$T=RC \ln 2.$$

Thus, irrespective of variations in the supply voltage B+ for the circuit, the time required to once again render the transistor 10 conductive after it has been rendered nonconductive is constant and is dependent only upon the values of the resistor 15 and the capacitor 14 used in the circuit. Temperature compensation for the circuit, as stated previously, may be obtained by matching the components by fabricating them on a single integrated circuit chip with $V_X$ being provided by the base emitter diode of a transistor identical to 10.

FIG. 2 shows the variations of the voltage $V$ on the base of the transistor 10 through the foregoing operation which was described in conjunction with FIG. 1.

Figure 3:
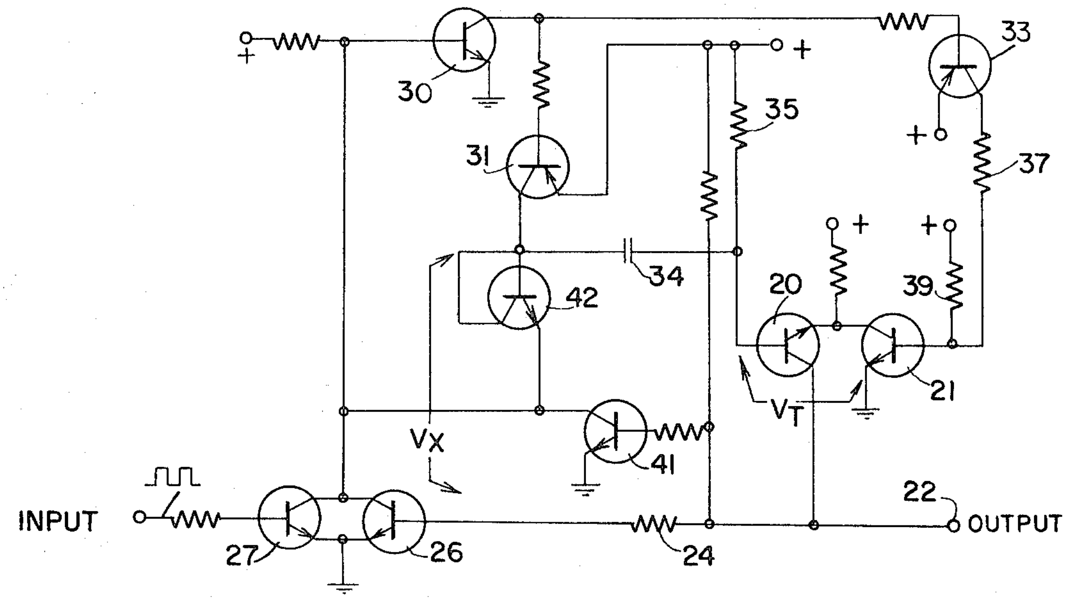
FIG. 3 is a detailed schematic diagram of a preferred embodiment of the invention.

Referring now to FIG. 3, there is shown an integrated circuit voltage and temperature compensated monostable multivibrator circuit for providing an output pulse for a predetermined time interval after the application of a positive input pulse. In the absence of any input pulses, the steady state operation of this circuit is such that a pair of transistors 20 and 21 are conducting at saturation, with the transistor 21 being operated at a low point on its saturation curve. As a result, the output signal applied to an output terminal 22 is near ground potential.

This potential present on the collector of the transistor 20 also is applied through a coupling resistor 24 to the base of an NPN-transistor 26, which is one of two transistors 26 and 27 of an AND-gate circuit, to cause the transistor 26 to be rendered nonconductive. In the absence of an input triggering pulse, the transistor 27 also has a ground or negative potential applied to its base; so that the transistor 27 also is nonconductive, with the result that the potential at the interconnected collectors of the transistors 26 and 27 rises to a positive value determined by the low voltage (1.2 volts down to 0.9 volts) B+ operating potential for the circuit, with this potential being applied to the base of an NPN-control transistor 30 to render the transistor 30 conductive.

When this occurs, the potential on the collector of the transistor 30 drops to near ground potential, forward biasing a pair of PNP-transistors 31 and 33 into conduction. The transistor 31 then forms a low-impedance path between the source of positive potential and one terminal of a capacitor 34, which is the timing capacitor for the multivibrator circuit. The other terminal of the capacitor 34 is connected to the junction of the base of the transistor 20 and a charging resistor 35 the other end of which is connected to the source of positive potential.

With the transistor 33 being rendered conductive, the positive potential obtained from the collector thereof through a resistor 37 and applied to the base of the transistor 21 is sufficient to forward bias the transistor 21 into a high state of saturation (very low collector emitter voltage), with the result that the voltage drop between the base of the transistor 20 (conductive in its steady state condition) and ground is established at a value $V_T$, referred to in the description of the operation of the circuit shown in FIG. 1.

When a positive input triggering pulse is received, the transistor 27 of the AND-gate is rendered conductive, causing ground potential to be applied to the base of the transistor 30, rendering that transistor nonconductive. This in turn causes the transistors 31 and 33 to be rendered nonconductive. At the time the transistor 33 is rendered nonconductive, the potential on the base of the transistor 21 decreases since a primary source of base current has been removed (i.e., through transistor 33 and resistor 37). Thus, the transistor 21 is biased into a lower state of saturation (slightly higher collector emitter voltage).

At the same time, an NPN-switching transistor 41 is biased into conduction to complete a conductive path to ground for the capacitor 34 through a now forward biased transistor diode 42, thereby applying the voltage $V_X$ to the capacitor to lower the voltage on the base of the transistor 20, in the manner described above in conjunction with the circuit of FIG. 1. This renders the transistor 20 nonconductive. The capacitor 34 then charges through the resistor 35, the transistor diode 42 and the switching transistor 41, until the charge on the capacitor 34 applied to the base of the transistor 20 reaches the value $V_T$ necessary to forward bias the transistor 20 into a state of conduction.

During the time that the transistor 20 is nonconductive, however, it should be noted that the positive potential on its collector is sufficient to forward bias the transistor 26 in the AND-gate circuit, thereby maintaining the ground potential on the base of the transistor 30. Thus, no further input pulses cause recycling of the circuit until it has been reset by the timing of time out period of the RC circuit including the capacitor 34 and the resistor 35. At the time that the transistor 20 is rendered conductive, if no further input pulses are present on the base of the transistor 27, both of the transistors 26 and 27 once again are rendered nonconductive, causing the transistor 30 to be rendered conductive; and the initial conditions of operation for the circuit are resumed.

When the transistor 20 is initially driven into conduction, the transient switching conductive state of the transistor 20 exists. During this transient switching state of the transistor 20, the base emitter circuit of the transistor 20 draws less current than when it is operating at full saturation, thus causing a slightly lower base emitter voltage. As a consequence, it is necessary to operate the transistor 21 at a lower level of saturation (slightly higher collector emitter voltage) in order that the voltage $V_T$ remains equal to the voltage $V_X$ and the steady state value of $V_T$.

Once the AND-gate 26, 27 has been reset, the transistor 33 once again is rendered conductive, causing a higher positive potential to be applied to the base of the transistor 21; so that the transistor 21 operates at a higher level of saturation during the steady state operation of the multivibrator circuit. This maintains the voltage $V_T$ equal to the voltage $V_X$ established across the transistors 42 and 41 when the transistor 41 is conductive. Adjustment of the relative values of the resistors 37 and 39 permits an adjustment of the amount of change in the operating level of the transistor 21 which is made between the transient and steady state operating conditions of the circuit, in order to maintain $V_T$ constant when the transistor 20 is conducting in either the steady state or transient conditions.

It should be noted that when the transistor 20 once again is rendered conductive, the transistor 41 is back biased and rendered nonconductive, thereby reestablishing the original charging path for the timing capacitor 34 through the transistor 31 and the base emitter path of the transistor 20. By commutating the potentials on both sides of the capacitor in the manner described, the timing period of the circuit is independent of the value of the supply voltage over a relatively wide range. In addition, the circuit may be operated at very low voltage levels (down to 0.9 volts) in a range below that normally possible when voltage stabilization is obtained by the use of voltage dividers in the form of forward biased diode strings. Stability with temperature variations is obtained since $V_T$ and $V_X$ are derived from similarly constructed diodes on an I.C. chip. Thus, their voltages exactly track each other.

We claim:

1. A multivibrator having a cycle of operation which is substantially independent of temperature and supply voltage variations including in combination:

first and second voltage supply terminals for connection across a source of DC supply voltage;

an output transistor;

timing capacitor means having first and second terminals, with the first terminal thereof connected to the output transistor to control the conduction thereof in accordance with the charge on the timing capacitor means;

first circuit means coupling the first terminal of the timing capacitor means with the first voltage supply terminal;

second circuit means coupling the second terminal of the timing capacitor means with the first voltage supply terminal; and switching means connected in circuit between at least the second terminal of the timing capacitor means and the second voltage supply terminal, with operation of the switching means establishing first and second charging paths for the timing capacitor through said first and second circuit means, respectively, each charging path having parameters which vary in the same manner with variations in supply voltage and temperature.

2. The combination according to claim 1 wherein the multivibrator is formed on a single integrated circuit capable of operation with a supply voltage of 1 volt.

3. A multivibrator, the operation of which is substantially independent of supply voltage variations, including in combination:

a first transistor having base, collector, and emitter electrodes, with the emitter electrode being coupled with a point of reference potential and the base emitter circuit thereof having predetermined voltage temperature characteristics;

switch means connected in circuit between the point of reference potential and a voltage source and having said predetermined voltage temperature characteristics with the switch means closed;

resistive impedance means and a timing capacitor connected together at a first junction and connected in series with the switch means, in the order named, between the voltage source and the point of reference potential, the first junction being coupled with the base of the first transistor;

the transistor being normally conductive when the switch means is open, with closure of the switch means causing a back biasing potential to be applied through the capacitor to the base of the transistor to render the same nonconductive, the capacitor charging toward the value of the voltage source through the closed switch means and the resistive impedance means until the transistor is again forward biased whereupon the transistor conducts.

4. The combination according to claim 3 wherein the switch means includes switching transistor means and the first transistor and the switching transistor means are part of the same integrated circuit, thereby causing accurate temperature tracking thereof.

5. The combination according to claim 4 wherein the source of voltage is a low voltage source of the order of the voltage drop across two series connected semiconductor diode junctions.

6. The combination according to claim 3 further including means in series with the emitter of the first transistor and having a first impedance when the first transistor is initially rendered conductive and having a second impedance during the steady state conduction of the first transistor.

7. The combination according to claim 6 wherein the first impedance of the means in series with the emitter of the first transistor is higher than the second impedance thereof in order to maintain the voltage drop between the base of the first transistor and the point of reference potential equal to the voltage drop between the junction of the capacitor and the point of reference potential across the switch means during transient and steady state operation of the first transistor.

8. A voltage and temperature stable monostable multivibrator including in combination:

a first transistor having base, collector, and emitter electrodes, the emitter electrode of which is coupled in circuit with a point of reference potential and the collector of electrode of which is coupled to a source of operating potential;

a first impedance means and a switch means connected together at a first junction, with the switch means being coupled to the point of reference potential and with the first impedance means being coupled to the source of operating potential;

second impedance means coupled between the source of operating potential and the base of the transistor;

capacitor means coupled to the first junction and to a second junction formed by the coupling of the base of the transistor with the second impedance means, the switch means being normally open, causing a predetermined potential to be established between the base electrode of the transistor and the point of reference potential across the forward biased base emitter circuit of the transistor, the parameters of the switch means being selected to establish the same predetermined potential between the point of reference potential and the first junction upon closure of the switch means to back bias the first transistor through the capacitor means, the capacitor means thereupon charging through the second impedance and the switch means toward the value of the source of operating potential.

9. The combination according to claim 8 wherein the first impedance means and the switch means constitute second and third transistors, respectively, with the second transistor being conductive when the third transistor is nonconductive and vice versa, to cause the charging path for the capacitor to be in a first direction through the second transistor and the base emitter path of the first transistor when the third transistor is nonconductive, and to be in a second direction through the third transistor and the second impedance means when the second transistor is nonconductive.

10. The combination according to claim 9 wherein the monostable multivibrator circuit is formed on a single integrated circuit chip so that the first and third transistors are matched, having characteristics which trace one another with changes in the ambient temperature to which the chip is subjected.

11. The combination according to claim 9 further including means in the emitter circuit of the first transistor for compensating for differences in the voltage drop across the base emitter path of the first transistor during steady state conductive conditions and transient conductive conditions to cause the voltage drop between the base of the first transistor and the point of reference potential to be substantially the same during steady state and transient conductive conditions of the first transistor.

12. The combination according to claim 11 wherein the source of operating potential is a low voltage source of less than 2 volts.

13. The combination according to claim 11 wherein the further means connected in the emitter circuit of the first transistor includes a fourth transistor, the emitter collector path of which is connected in circuit between the emitter of the first transistor and the point of reference potential, said fourth transistor being operated at one level of saturation when the first transistor is in a steady state conductive condition and being operated at a lower level of saturation when the first transistor is in a transient state of conduction.

14. The combination according to claim 13 wherein the conductivity of the fourth transistor is varied with the operation of the conductivity of the third transistor, so that the fourth transistor conducts at a low level of saturation when the third transistor is conductive and conducts at a higher level of saturation when the third transistor is nonconductive.

15. The combination according to claim 14 further including a gating circuit, the output of which is used to control the conduction of the second, third and fourth transistors, with an output signal being obtained therefrom causing the second transistor to become nonconductive, the third transistor to become conductive and the fourth transistor to be biased into a low level of saturation, inputs to the gating circuit being obtained from an external source of signals and from the collector of the first transistor when the first transistor is nonconductive, whereupon the presence either of an external signal or a signal obtained from the nonconductive first transistor causes an output to be obtained from the gating circuit.

16. The combination according to claim 15 further including a fifth transistor controlling the base biasing circuit of the fourth transistor to cause a high forward biasing potential to be applied to the base of the fourth transistor when the fifth transistor is conductive and to cause a lower forward biasing potential to be applied to the base of the fourth transistor when the fifth transistor is rendered nonconductive, the conduction of the fifth transistor being controlled by the output of the gating circuit.

* * * * *